(12) United States Patent
Rivoir

(10) Patent No.: US 8,886,987 B2
(45) Date of Patent: Nov. 11, 2014

(54) DATA PROCESSING UNIT AND A METHOD OF PROCESSING DATA

(75) Inventor: Jochen Rivoir, Magstadt (DE)

(73) Assignee: Advantest (Singapore) Pte Ltd, Singapore (SG)

(*) Notice: Subject to any disclaimer, the term of this patent is extended or adjusted under 35 U.S.C. 154(b) by 833 days.

(21) Appl. No.: 13/119,958

(22) PCT Filed: Sep. 19, 2008

(86) PCT No.: PCT/EP2008/007912
§ 371 (c)(1),
(2), (4) Date: Apr. 26, 2011

(87) PCT Pub. No.: WO2010/031417
PCT Pub. Date: Mar. 25, 2010

(65) Prior Publication Data
US 2011/0197086 A1   Aug. 11, 2011

(51) Int. Cl.
*G06F 1/04* (2006.01)
*G06F 1/24* (2006.01)
*G01R 31/317* (2006.01)
*G01R 31/3193* (2006.01)

(52) U.S. Cl.
CPC .... *G01R 31/31726* (2013.01); *G01R 31/31937* (2013.01); *G01R 31/3193* (2013.01)
USPC ........... 713/500; 713/400; 713/401; 713/503; 375/355

(58) Field of Classification Search
CPC .................................. G06F 1/12; H04L 7/027
USPC ................... 713/400, 401, 500, 503; 375/355
See application file for complete search history.

(56) References Cited

U.S. PATENT DOCUMENTS

| 5,247,161 | A  | * | 9/1993  | Actis et al. ............... 235/462.18 |
| 7,113,560 | B1 |   | 9/2006  | Huang et al. |
| 2001/0018751 | A1 | * | 8/2001  | Gresham ...................... 713/401 |
| 2003/0061564 | A1 |   | 3/2003  | Maddux |
| 2004/0022196 | A1 |   | 2/2004  | Rivoir |
| 2005/0265440 | A1 |   | 12/2005 | Sohn |
| 2008/0034265 | A1 | * | 2/2008  | Kang ............................ 714/736 |
| 2008/0068355 | A1 |   | 3/2008  | Chen et al. |

FOREIGN PATENT DOCUMENTS

WO    2010031417  A1    3/2010

OTHER PUBLICATIONS

Kazamaki, T., "Milestones of New-Generation ATE", IEEE Design & Test of Computers, 2(5), pp. 83-89, Oct. 1985.
Rivoir, J., "Fully-Digital Time-To-Digital Converter for ATE with Autonomous Calibration", IEEE International Test Conference, 2006, paper 6.3.

* cited by examiner

*Primary Examiner* — Michael J Brown

(57) ABSTRACT

A data processing unit has a time information provider for processing a clock or a strobe signal, configured to provide a digitized clock or strobe time information on the basis of the clock or strobe signal and at least one data extraction unit, coupled to the time information provider and configured to select data from a sequence of data samples of a data signal depending on the digitized clock or strobe time information.

31 Claims, 11 Drawing Sheets

DATA PROCESSING UNIT AND A METHOD OF PROCESSING DATA

BACKGROUND OF THE INVENTION

Embodiments according to the present invention relate to a data processing unit and a method of processing data.

Some embodiments according to the invention relate to a tester for testing a device under test (DUT).

A device under test (also designated briefly as "DUT"), for example an integrated circuit, is tested in order to ensure a correct operability of the device. Usually, a DUT is tested with an automatic test equipment (ATE). Test patterns or test stimuli are applied to the DUT by the ATE, which is in the following also briefly named "tester", and electrical output signals from the DUT are compared to expected data. With this method, different DUT parameters can be proven or characterized, and if necessary the electronic devices (DUT) are split into one or more different categories, for example pass or fail categories or performance categories. In the production test, the influence of different parameters on a proper operation of the DUT can be checked or proven. Such parameters may be, among others, temperature, humidity, over-voltage or, for example, tight timing parameters.

The output timings of digital signals sent from a DUT to the tester can be very tight. The digital signals sent from a DUT to the tester may be coupled to (or synchronized with) a central master clock from the tester, or may be source-synchronous signals. For source-synchronous signals, the bus clock can be generated and provided by the DUT.

If a DUT output arrival time (for example a time at which a data signal from a DUT arrives at an input of a tester, for example referenced to a master clock of the tester) is not known exactly, or if the DUT output arrival time is not stable during a test, the ATE does not know exactly where to place a strobe time (or strobe point-in-time) in order to sample the received data from the dut, for example to compare the received data from the DUT with expected data.

For example, the capture of data from a source-synchronous bus with clock or data strobe signal can be difficult, when clock and/or strobe (or clock/strobe) and data are separated by long propagation delays (or propagation delay differences), e.g. handled by different chips or boards, for example in an automated test equipment (ATE). In other words, in some cases it is a challenge to strobe the data in a correct manner in such an environment.

A data strobe channel may for example comprise a (programmable) routing in order to adjust a propagation delay (or a propagation delay difference) between a strobe signal and a data signal. However, this programmable routing of the data strobe channel (which may process the data strobe signal) may sometimes lead to delays that are too long to still capture the data safely.

A tester may comprise a strobe signal channel and a plurality of data signal channels. In a conventional way, the data paths for the plurality of data signals may comprise buffer delays in order to compensate a propagation delay of the strobe signal routing. The required delay matching between the strobe signal and the plurality of data signals can be very difficult, in particular across multiple chips, for example across multiple chips on a channel board for a test system, or across multiple chips connected to so-called dut-board or load board.

For example, in order to reduce the production test time, a plurality of DUTs on a respectively configured load board can be tested in parallel. The propagation delay (or propagation delay differences) between the different strobe and data signals can be compensated, at least partially, by the above-mentioned buffer delays.

In the US patent application US 2004/0022196 A1, another conventional method for compensating delays, for recovering a bitstream from a signal, is described. Said patent application describes an oversampling bit stream recovery, which is applicable to embedded clocks, where data and clock are embedded on one physical signal.

In view of the above, there is a need for a reliable concept for extracting data from a sequence of data in response to a clock or strobe signal.

SUMMARY

According to an embodiment, a data processing unit may have a time information provider for processing a clock or a strobe signal, and at least one data extraction unit. The time information provider is configured to provide a digitized clock or strobe time information on the basis of the clock or strobe signal. The at least one data extraction unit is coupled to the time information provider and is configured to select data from a sequence of data samples of a data signal depending on the digitized clock or strobe time information, wherein the clock-or-strobe signal is physically different from the data signal; wherein the time information provider has a time-to-digital converter configured provide, as the digitized clock-or-strobe time information, a digitized time stamp describing a time of a transition of the clock-or-strobe signal, wherein the digitized clock or strobe time information is represented as a multi-bit value encoding the clock or strobe time information or wherein the digitized clock-or-strobe time information is represented as an increment-decrement-information, wherein the increment-decrement-information describes a difference between a timing of a currently detected transition of the clock-or-strobe signal and a timing of a previous transition of the clock-or-strobe signal.

The clock-or-strobe signal may optionally be physically separate from the data signal. For example, the clock-or-strobe signal may be received from a different pin of a device-under-test than the data signal, if the data processing unit is applied in a test system.

According to another embodiment, a tester for testing a device under test may have a master clock signal line, a strobe signal generator, a comparator unit, a device under test (DUT) clock generator, a data processing unit as mentioned above and a device under test interface. The tester is configured such that the strobe signal generator generates a strobe signal for the data processing unit on the basis of the master clock signal, and such that the DUT clock generator generates a DUT clock signal coupled to the DUT interface on the basis of the master clock signal. The data processing unit is coupled via at least one data signal line to the DUT interface to receive the data signal. The data processing unit is also coupled to a comparator unit. The comparator unit is configured to compare the selected data from the data processing unit with expected data and to provide a test result based on the comparison of the selected data with the expected data.

According to another embodiment, a tester for testing a device under test (DUT) may have: a comparator unit; a device-under-test (DUT) interface; and a data processing unit as mentioned above; wherein the data processing unit is coupled to the DUT interface to receive from the DUT interface the data signal and the clock-or-strobe signal, and to select data from the sequence of data samples of the data signal, in response to the clock-or-strobe signal; and wherein the comparator unit is configured to compare the selected data provided by the processing unit with expected data, and to provide a test result based on the comparison of the selected data with expected data.

According to another embodiment, a method of processing data may have the steps of processing a clock or strobe signal to provide a digitized clock or strobe time information on the basis of the clock or strobe signal and selecting data from a sequence of data samples of a data signal depending on the digitized clock or strobe time information, wherein the clock-or-strobe signal is physically different from the data signal; wherein providing the digitized clock or strobe time information has providing, as the digitized clock or strobe time information, a digitized time stamp describing a time of a transition of the clock-or-strobe signal; wherein the digitized clock or strobe time information is represented as a multi-bit value encoding the clock or strobe time information or wherein the digitized clock-or-strobe time information is represented as an increment-decrement-information, wherein the increment-decrement-information describes a difference between a timing of a currently detected transition of the clock-or-strobe signal and a timing of a previous transition of the clock-or-strobe signal.

Another embodiment may have a computer program for performing a method of processing data as mentioned above, when the computer program runs on a computer.

Some embodiments according to the invention may be partly or entirely implemented in hardware.

Some embodiments may alternatively or additionally be partly or entirely embodied or supported by one or more suitable computer programs, which can be stored on or otherwise provided by any kind of data carrier. The computer program may run on a computer or any suitable data processing unit.

BRIEF DESCRIPTION OF THE DRAWINGS

Various embodiments according to the invention will be explained below in more detail with reference to the accompanying figures, wherein.

DETAILED DESCRIPTION OF THE INVENTION

With reference to the accompanying FIGS. 1 to 9, embodiments of the data processing unit and of the method of processing data will be explained in detail below. Also, the usage of the data processing unit and of the method of processing data for testing devices under test will be described.

In the following, a conventional approach of compensating a propagation delay difference between a data signal and a data strobe signal will be described in order to facilitate an understanding of the inventive concept.

Figure 1:
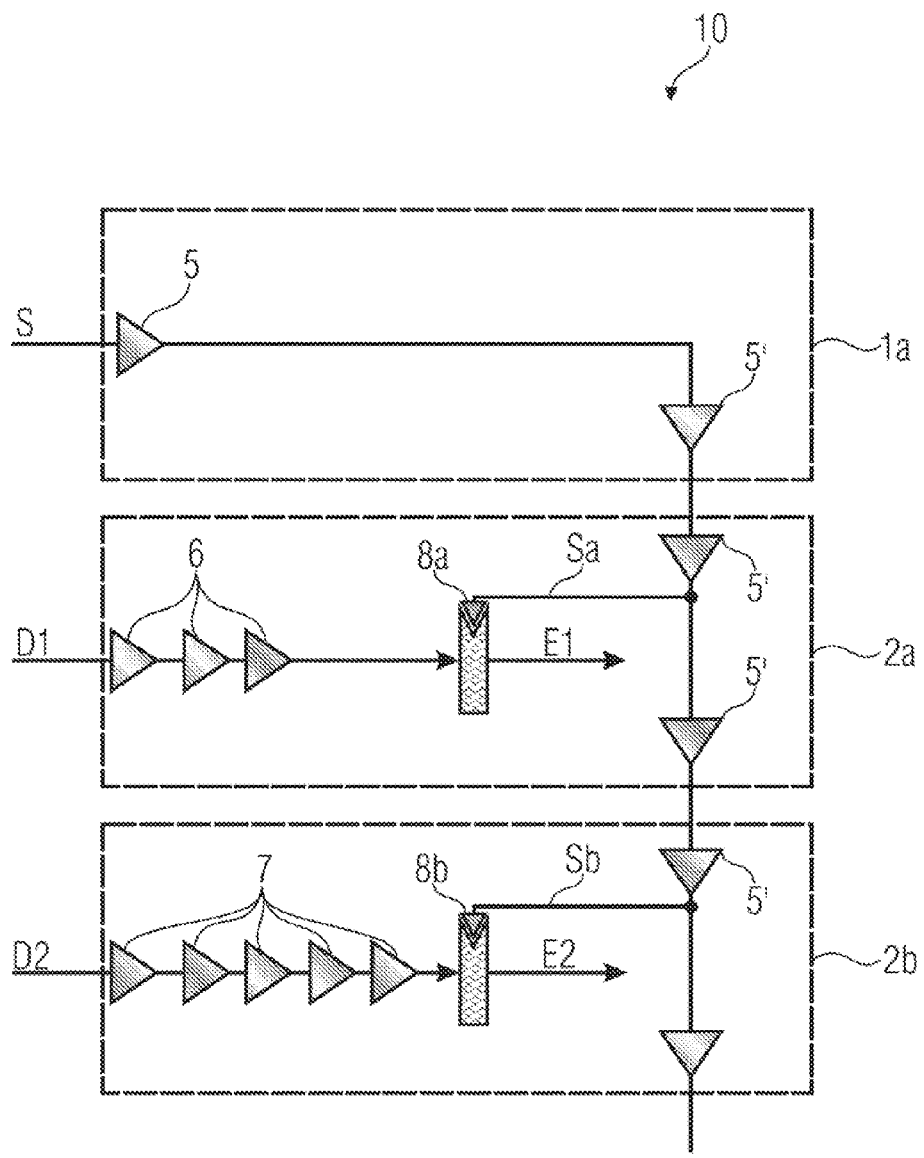
FIG. 1 shows a schematic diagram of a conventional circuit to compensate a propagation delay for strobe and data channels.

In order to compensate the delay caused by a data strobe routing, a conventional data processing unit may comprise a couple of buffer delays. A block schematic diagram of such a conventional data processing unit 10 is shown in FIG. 1.

The data processing unit 10 comprises a strobe channel 1a configured to receive a strobe signal S. The strobe channel 1a may comprise buffer delays 6, 7 in order to shift or adjust (e.g. time-shift or time-adjust) the strobe signal S relative to a data signal. In FIG. 1, two data signals D1 and D2 and the respective data channels 2a and 2b are depicted. The data channels 2a, 2b may have the ability to delay the data signals D1, D2 to match (e.g. time-match) the different data signals D1, D2 to the corresponding routing delays of the strobe signal S. Moreover, the data signals may have different routings and may therefore exhibit a propagation delay difference or skew with respect to each other and with respect to the strobe signal S. Such a delay or delay difference may be compensated by a number of active buffer delays 6, 7 included in the data signal paths of D1 and D2. The strobe signal S may be forwarded by vertical buffers 5' to the different data channels 2a and 2b. Depending on the buffer delays included into the data paths of the data signals D1 and D2 and the strobe paths, a certain data signal or data bit may be strobed at a position 8a,8b (for example by a latch or register operated in dependence on the delayed strobe signal). The data signal D1 strobed at the position 8a with the strobe signal Sa is then considered as the result E1 of the data channel 2a. The data signal D2 strobed at the position with the strobe signal Sb is considered as the result of the data channel 2b.

Achieving the needed delay matching in a conventional data processing unit is very difficult, in particular across multiple chips and a plurality of data signals D1 to Dn. For example, providing a long delay may result in a distortion of the signals. The data signals may be send from a device under test. The usual way to match different data signals and clock/strobe signals is adjusting the propagation delay with tunable delay lines. One of the drawbacks of this conventional approach is the time-consuming, complicated and less flexible way of performing this compensation.

Figure 2:
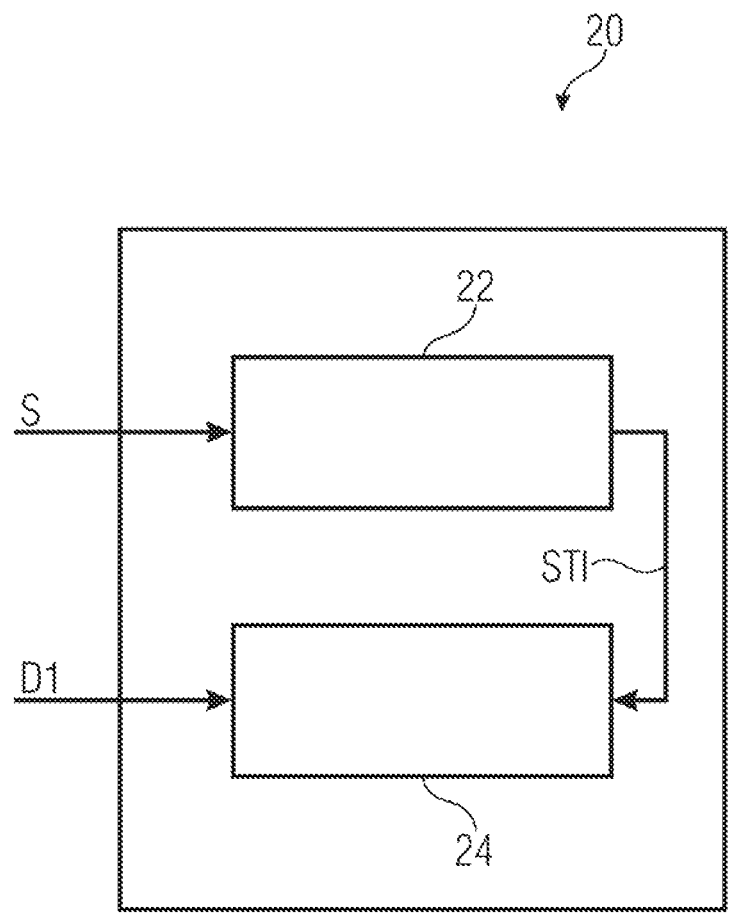
FIG. 2 shows a block schematic diagram of a data processing unit, according to an embodiment according to the invention.

FIG. 2 shows a block schematic diagram of a data processing unit, according to an embodiment according to the invention. The data processing unit 20 comprises a time information provider 22 for processing a clock or strobe signal S. The time information provider 22 is configured to provide a digitized clock or strobe time information STI on the basis of the clock or strobe signal S. At least one data extraction unit 24 is coupled to the time information provider 22 and configured to select data from a sequence of data samples of a data signal D1 depending on the digitized clock-or-strobe time information STI.

The embodiment shown in FIG. 2 is based on the finding that a distribution of a digitized clock or strobe time information from a time information provider to a data extraction unit can be performed with much higher reliability and/or accuracy than a distribution of an analog timing signal. In most environments, it is possible with moderate effort to reliably distribute a digitized information, while it needs considerable effort to distribute any analog timing signal. Also, it has been found that the digitized timing information can be distributed to a plurality of receiving devices (for example data extraction units) without loss of precision. Accordingly, the digitized timing information can be used to synchronize multiple data extraction units with high precision and reliability.

The data processing unit 20 may optionally comprise a plurality of data extraction units 24 configured to select data from a sequence of data samples of corresponding data signals. The one or more data signals D1, together with the one or more strobe or clock signals, may form a bus or a link. A test system or a tester (ATE) may optionally comprise a plurality of such busses or links. Each of the data extraction units may be coupled to a separate time information provider and may be configured to select data from the sequence of data samples of the respective data signal depending on the digitized clock or strobe time information provided by the corresponding time information provider.

The clock-or-strobe time information may be forwarded to one or more data extraction units 24 using a "Daisy Chain" chain configuration. For example, the clock-or-strobe time information may be forwarded from the time information provider to a first data extraction unit in a first cycle, from the first data extraction unit to a second data extraction unit in a subsequent second cycle, and so on. Alternatively, a programmable routing may be provided to route the clock-or-strobe time information from the time information provider to one or more data extraction units. For example, a data path from the time information provider to a first data extraction unit may be enabled in a first cycle, to transfer the clock-or-strobe time information to the first data extraction unit. Subsequently, a data path from the time information provider to a second data extraction unit may be enabled in a second cycle, to transfer the clock-or-strobe time information to the second data extraction unit. Alternatively, a star configuration may be used for the transport of the clock-or-strobe time information from the time information provider to a plurality data extraction units, such that, for example, the clock-or-strobe time information can be transferred from the time information provider to a plurality of data extraction units simultaneously. However, other configurations are naturally possible.

The clock or strobe time information STI may be forwarded as a digital word. In some embodiments, the digitized clock or strobe time information may be represented as one or more discrete coded values. The digitized clock or strobe time information forwarded from the time information provider 22 to the at least one data extraction unit 24 may be represented as a multi-bit value encoding the clock or strobe time information. The at least one data extraction unit 24 may be coupled to the time information provider 22 in a daisy chain, a parallel or in a serial configuration. This means that the digitized clock-or-strobe time information may be forwarded to the at least one data extraction unit in parallel or in a serial way, i.e. for example during several clock periods applied to the data processing unit.

Alternatively, the clock-or-strobe time information may be forwarded in the form of a digitized information describing a deviation between an initial clock-or-strobe time and an updated clock-or-strobe time. For example, a digitized signed numerical value may be transferred, which represents a change of the clock-or-strobe time with respect to an initial value (or a previously used value). In some embodiments, an increment/decrement information may be transferred from the time information provider to the one or more data extraction units. Thus, two signal lines may be sufficient in order to transfer an information indicating whether the clock-or-strobe time should be increased, decreased or held constant. In other words, a information comprising only three states (increase clock-or-strobe time, decrease clock-or-strobe time and hold clock-or-strobe time constant) or even only two states (increase clock-or-strobe time, decrease clock-or-strobe time) may be used to communicate the digitized clock or strobe time information STI from the time information provider to the one or more data extraction units.

In some embodiments, a rate at which the digitized clock-or-strobe time information (STI) is transferred from the time information provider to the one or more data extraction units may be synchronized with a master clock. For example, a digitized clock-or-strobe time information may be transferred once per master clock cycle.

In other embodiments, it may be sufficient to transfer the digitized clock-or-strobe time information only once per I master clock cycles (or clock-or-strobe signal periods), wherein I>1. In some embodiments, I may be larger than 10, or even larger than 100 or larger than 1000. Accordingly, a significant amount of energy (which would be needed for a permanent exchange of the clock-or-strobe signal) can be saved in some cases.

In some embodiments, the digitized clock-or-strobe time information may be transferred from the time information provider to the data extraction unit only once per J data positions of the data signal, wherein J>1. For example, a data position may designate a time interval of the data signal during which a single value or a single bit is transmitted via the data signal.

In some embodiments, digitized clock-or-strobe time information (or an information indicating a change of the clock-or-strobe time information) may be transferred in response to a change of the clock-or-strobe time information.

The clock-or-strobe time information (STI) may be transferred synchronously or asynchronously with respect to the master clock. For example, the digitized clock-or-strobe time information may be transferred using a bus system which is independent from the master clock. Also, there are many different methods for obtaining the digitized clock-or-strobe time information in the time information provider. In general, the time-information-provider may be configured to provide a digitized time stamp indicating a time of a transition in the clock-or-strobe signal. Devices for providing such a digitized time stamp describing a timing of an edge are also known as time-to-digital converters (TDC). In other words, time-to-digital converters (TDC), which may for example be used in automated test equipment, time-stamp selected events (for example an edge or transition) in a signal (for example from a device-under-test). For example, a time-to-digital converter may be configured to measure a time of a transition relative to a fixed (or stable) tester clock.

Different architectures may be used to provide the digitized clock-or-strobe time information. For example, an ADC sampling may be used. The ADC sampling may interpolate samples of an analog-to-digital converter around zero-crossings or perform a digital down-conversion to track phase changes.

Alternatively, a ramp interpolation may be used to provide the digitized clock-or-strobe time information. The ramp integration may integrate a current during a measured time and digitize the end voltage using an Analog-to-digital converter (ADC).

Alternatively, a delay line may be used to provide the digitized clock-or-strobe time information. A delay line TDC may inject a measured transition into a chain of gate delay elements and capture the chain's state with the next coarse clock.

Alternatively, a sampling offset may be used to provide the digitized clock-or-strobe time information. Sampling offset (SO) TDC achieves a fine resolution by exploiting a random sampling offset mismatch between multiple parallel flip-flops.

Alternatively, a vernier oscillator may be used to provide the digitized clock-or-strobe time information. A vernier oscillator TDC may use two counted oscillators with slightly different periods $\tau_s$, $\tau_f$, where $\tau_s > \tau_f$, to achieve a fine resolution of $\Delta\tau = \tau_s - \tau_f$. A measured event (for example an edge or transition of the clock-or-strobe signal) may trigger the slow oscillator. Time t later, a next coarse clock (for example a master clock) triggers the fast oscillator. After $c = t/\Delta\tau$ slow cycles the fast oscillator has cycled more often than the slow oscillator.

Alternatively, a vernier delay line may be used to provide the digitized clock-or-strobe time information.

Alternatively, a DLL-stabilized vernier delay line may be used to provide the digitized clock-or-strobe time information.

Alternatively, a double-resolution time quantizer, a vernier oscillator array or a pulse shrinking delay line may be used to provide the digitized clock-or-strobe time information on the basis of the clock-or-strobe signal.

Some of the above mentioned methods for providing the digitized clock-or-strobe signal are summarized in the article "Fully-Digital Time-to-Digital Converter for ATE with Autonomous Calibration" by J. Rivoir (published: IEEE International Test Conference (ITC), Santa Clara (Calif.), USA, Oct. 24-26, 2006, Paper 6.3). Some possibilities for obtaining the digitized clock-or-strobe signal (i.e. for providing a digitized information describing a timing of an event, like a transition) are also described in the references cited in said article.

Figure 3:
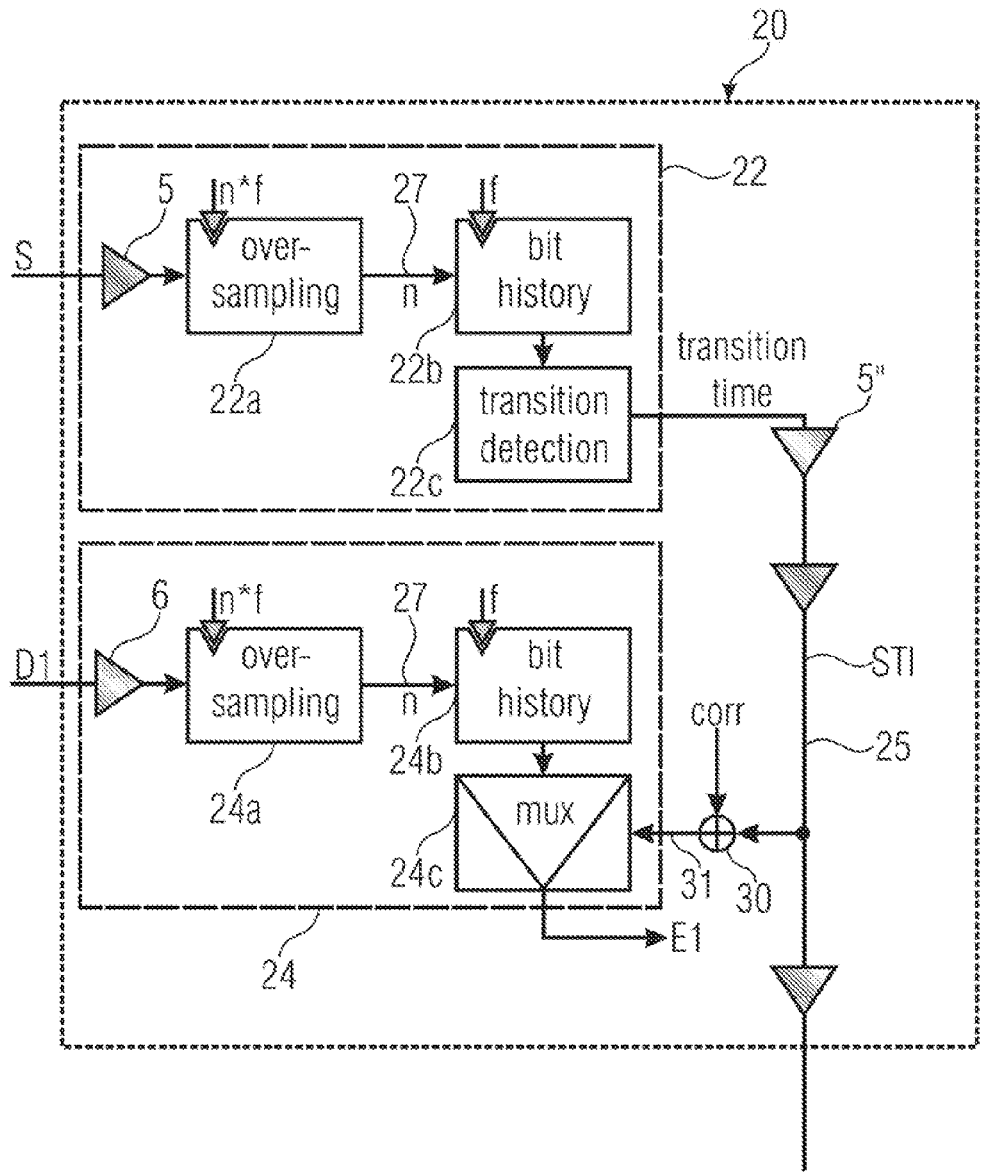
FIG. 3 shows a block schematic diagram of a data processing unit, according to another embodiment according to the invention.

FIG. 3 shows a block schematic diagram of further embodiment according to the present invention. As the embodiment shown in FIG. 3 is similar to the embodiment shown in FIG. 2, identical means and signals are designated with identical reference numerals herein.

In the embodiment shown in FIG. 3, the time information provider 22 of the data processing unit 20 comprises a first sampling unit 22a which is configured to sample an incoming clock or strobe signal S. The incoming clock or strobe signal can be buffered using a buffer 5, which may be coupled to an input of the first sampling unit 22a. The time information provider 22 may further comprise a first bit history unit 22b coupled to the first sampling unit 22a and configured to temporarily store a sequence of samples of the clock or strobe signal S. As it is shown in FIG. 3, the time information provider 22 may further comprise a transition detection unit 22c coupled to the first bit history unit 22b. The transition detection unit 22c can be configured to detect a transition or strobe time information (STI) on the basis of the sequence of samples of the clock or strobe signal, which is temporarily stored in the bit history unit 22b. The transition detection unit may provide the transition time information to the at least one data extraction unit 24 as a digitized transition or strobe time information (also designated as a digitized clock or strobe time information). The time information provider may be connected with at least one data extraction unit 24 in a parallel or a serial manner or, for example, in a daisy chain configuration. The electrical connection 25, via which the STI is forwarded between the time information provider 22 and the at least one data extraction unit 24 may comprise, as indicated in FIG. 3, one, or more buffers 5'. The forwarding or transport of the transition time information or STI may need multiple pipeline clocks (not shown in FIG. 3) in some embodiments using a clocked pipeline, but a faster forwarding is naturally possible.

In the embodiment depicted in FIG. 3 the data extraction unit 24 comprises a second sampling unit 24a configured to sample the data signal D1 to obtain data samples of the data signal D1. The data signal may be buffered by a buffer 6 coupled between the data signal D1 and the input of the second sampling unit 24a, before it is processed by the sampling unit 24a. The data extraction unit 24 may comprise a second bit history unit 24b coupled to the second sampling unit 24a and configured to temporarily store a sequence of data samples of the data signal D1, sampled by the second sampling unit 24a. In this embodiment the data extraction unit 24 may furthermore comprise a data select unit 24c coupled to the second bit history unit 24b and configured to select data from the temporarily stored sequence of data samples depending on the digitized clock or strobe time information (STI) provided by the time information provider 22.

This means that, depending on the digitized clock or strobe time information, which is forwarded from the time information provider 22 via the connection 25 to the data selection unit 22c, data E1 (for example one bit) is selected from the sequence of data samples of the data signal D1, which sequence is temporarily stored in the second bit history unit 24b.

It should be noted that the terms "STI", "transition time information" and "digitized clock or strobe time information" are used interchangeably within this text.

The digitized clock or strobe time information may be forwarded to further data extraction units connected to the transition detection unit in order to select data from other data signals.

As it is shown in FIG. 3, the data processing unit 20 may optionally comprise a correction unit 30, which correction unit may be coupled to the at least one data extraction unit 24, and which correction unit may be configured to influence the selection of data from the sequence of data samples temporarily stored in the bit history unit 24b.

In order to influence the selection of data from the sequence of data samples, the correction unit 30 may be coupled to the connection 25 to receive the digitized clock or strobe time information. The correction unit 30 may be configured to change or modify the digitized clock or strobe time information provided on the electrical connection 25, to obtain a modified digitized clock or strobe time information, and to provide the modified digitized clock or strobe time information to the multiplexer 24c. The modification of the digitized clock or strobe time information performed by the correction unit 30 may therefore have an influence on the selection of the data E1 out of the sequence of data samples of the data signal D1 temporarily stored in the second bit history unit 24b. In other words, assuming that the digitized clock or strobe time information is a digitally encoded (e.g. binary-encoded, BCD-encoded, ternary-encoded, or encoded according to any other digital data representation) information describing a time at which an edge or transition of the clock or strobe signal S occurs, the correction unit 30 may modify said digitized clock or strobe time information, for example by increasing or decreasing a value represented by the digitized clock or strobe time information. The increased or decreased value may be used to encode, which bit (or which bits) out of a plurality of bits of the data sequence stored by the second bit history unit 31 is (are) forwarded as the data E1.

In another embodiment, the correction unit 30 may be coupled to the second bit history unit 24b and/or to the data selection unit 24c. The correction unit may be configured to change or shift the sequence of the data samples stored in the bit history unit 24b (for example with respect to an original position). For example, if a correction information indicates that an additional shift of two sample periods should be introduced, the correction unit may cause the bit history unit to shift the samples provided by the second sampling unit 24a by two more bit positions, in addition to transferring said samples into the bit history unit 24b.

Alternatively, or in addition, the correction unit may be configured to change or influence the selection of data from the sequence of the data samples stored in the bit history unit 24b.

To summarize the above, there are various different possibilities, how the selection of the data E1 out of the sampled data sequence provided by the second sampling unit 24a can be influenced in dependence on a digital value represented by the digitized clock or strobe time information.

In some embodiments, the data select unit 24c may comprise a multiplexer configured to select data (e.g. one bit) from the sequence of data samples temporarily stored in the second bit history unit 24b depending on the digitized clock or strobe time information, to obtain certain selected data E1 (for example a selected bit). This means that the digitized clock or strobe time information provided by the time information provider (which may for example represent a digitized value) may for example be used to set or select a multiplexer selection address, such that a certain data sample (for example a certain bit) temporarily stored in the bit history register (out of the plurality of bits stored in the second bit history register 24b) is selected.

The correction unit 30 may for example change a digital word—representing the digitized clock or strobe time information—such that a different multiplexer selection address is applied to the multiplexer 24c. Hence a different data sample is selected (when compared to a simple embodiment in which the correction unit is absent or inactive).

It is also possible that the correction unit changes directly the data selected by the multiplexer (for example by shifting the data input to the multiplexer) in order to influence the selection of the data E1 to be selected.

The correction unit 30 may be configured to influence the selection of the selected data sample E1, such that a propagation delay of the clock or strobe signal S and the data signal D1 (or a propagation delay difference between these signals) is compensated. A correct "sampling" of the data signal D1 (for example a correct choice of a point-in-time in a temporal evolution of the data signal D1, at which the data signal D1 is evaluated), or a correct selection of a data sample of the data signal D1, can be achieved by adding to the digitized clock or strobe time information or subtracting from the digitized clock or strobe time information a certain (for example predetermined) digital value, the digital value (for example designated as "Corr") representing the delay (or delay difference) between the clock or strobe signal S and the data signal D1. Thus, the correction unit may obtain a corrected digitized clock or strobe time information, for example for controlling the multiplexer 24c.

The correction unit 30 may be formed as an adder or subtracter in order to change the digitized clock or strobe time information (STI) in such a way that the propagation delay (or propagation delay difference) between the clock and strobe signal and the data signal is compensated. The correction unit 30 may change the digitized clock or strobe time information, and the changed digitized clock or strobe time information may be used for the selection of the data sample E1.

In the following, some further details will be described.

The first sampling unit 22a may be configured to digitize or sample the clock or strobe signal S with a first sampling frequency $f_{s1}$, which may be n-times (n≥2) higher than a first maximum frequency $f_{max1}$ of the clock or strobe signal S.

The second sampling unit 24a may be configured to sample or digitize the data signal D1 with a second sampling frequency $f_{s2}$, which may be m-times (m≥2) higher than the second maximum frequency $f_{max2}$ of the data signal D1, wherein the frequency $f_{max2}$ may be defined as an inverse of a minimum period duration of a data symbol of the digital signal D1. This means that the clock or strobe signal S may be n-times over-sampled, and that the at least one data signal D1 may be m-times over-sampled. The first and the second sampling unit can be considered as over-sampling units in an embodiment. In some embodiments, n may be different from m, while n may be equal to m in some other embodiments.

m and n may be integer numbers in some embodiments. However, it is not required that m and n are integer numbers.

In some embodiments according to the invention, the time information provider 22 may comprise a plurality of flip-flops (e.g. one or more clocked shift register chains) to temporarily store the sequence of samples of the clock or strobe signal S provided by the first sampling unit 22a. The at least one data extraction unit 24 may also comprise a plurality of flip-flops (e.g. one or more shift-register chains) to temporarily store the sequence of data samples of the data signal D1 provided by the second sampling unit 24a.

In FIG. 3, each of the bit history units 22b and 24b may include a plurality of flip-flops, for example arranged as a shift register, to temporarily store the sequence of samples of the clock or strobe signal S, or the sequence of data samples of the data signal D1. Clock signals of identical frequency f (which may for example serve as clock signals for shifting or updating bit sequences stored in the bit history units) may be applied to the first and the second bit history unit. Clock signals having an n-fold frequency (n×f) may be applied to the first 22a and the second 24a (over-)sampling unit, for example as sample clocks. That is, the clock or strobe signal and the data signal may be sampled with the same sampling rate, i.e. with the same sampling frequency ($f_{s1}=f_{s2}=n\times f$), as it is depicted.

The first and the second sampling units 22a, 24a can be clocked with the n-fold frequency compared to the first and the second bit history units. This means that the first and the second bit history unit 22b and 24b may be configured, as indicated by the arrow 27 in FIG. 3, to store temporarily at least n of the samples of the clock/strobe signal S or data signal D1, respectively. Therefore, in some embodiments n may be an integer value larger than 1.

The transition detection unit 22c in the time information provider 22 may be configured for detecting signal transitions in the (over-)sampled clock or strobe signal S temporarily stored in the bit history unit 22b.

The first bit history unit 22b and the second bit history unit 24b may be formed as a shift register which can at least store n-fold samples of the respective clock/strobe-signal or data signal.

However, other embodiments may optionally use bit history units which are clocked with a shift clock having the same clock rate as the sampling clock of the sampling units. Also, in some embodiments, the shift clock applied to the first bit-history unit 22b may be different in frequency from the shift clock applied to the second bit history unit 24b.

In some embodiments, the bit history unit 24b may optionally be configured to cover a longer period of time than the bit history unit 22b. For example, the bit history unit 24b may be configured to store a longer bit sequence than the bit history unit 22b. Alternatively, the bit history unit 24b may be clocked with a lower clock frequency than the bit history unit 22b. For example, the bit history unit 24b of the data extraction unit may be configured to store a plurality of periods of the data signal D1, while it may be sufficient to store a single period of the clock-or-strobe signal S in the bit history unit 22b. Thus, a propagation delay resulting from the forwarding of the digitized clock-or-strobe time information may be compensated. In other words, a propagation delay in forwarding the clock-or-strobe time information from the time information provider 22 to the data extraction unit 24 may be balanced by increasing the length of the bit history unit 24b of the data extraction unit.

Also, in some embodiments the correction unit 30 may optionally be used to (or configured to) compensate for a propagation delay in forwarding the clock-or-strobe time information from the time information provider 22 to the data extraction unit 24.

Figure 4A:
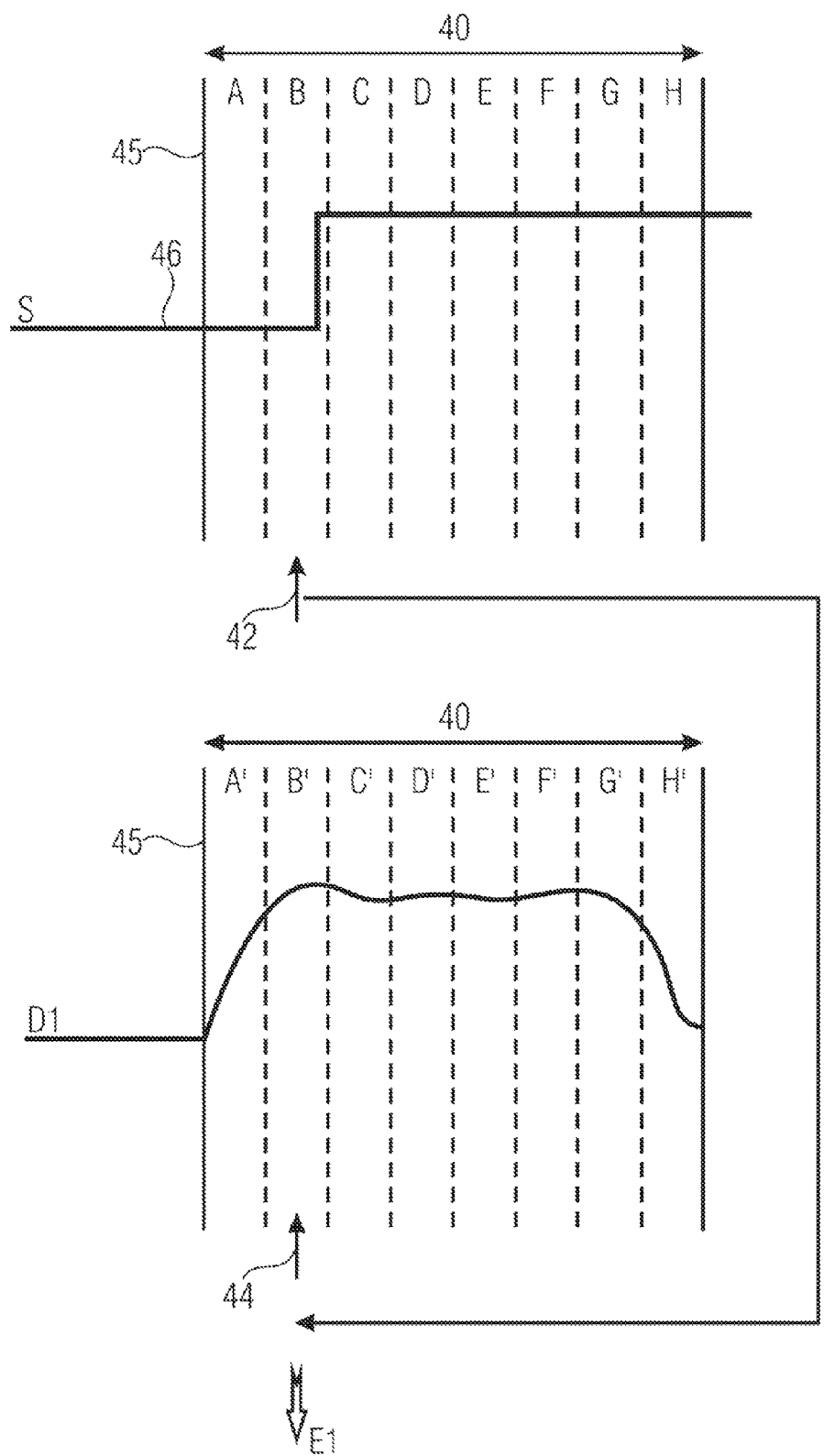
FIGS. 4a to 4c show schematic representations of a concept of digitizing a strobe time and selecting data on the basis of the digitized strobe time, according to embodiments according to the invention.
Figure 4B:
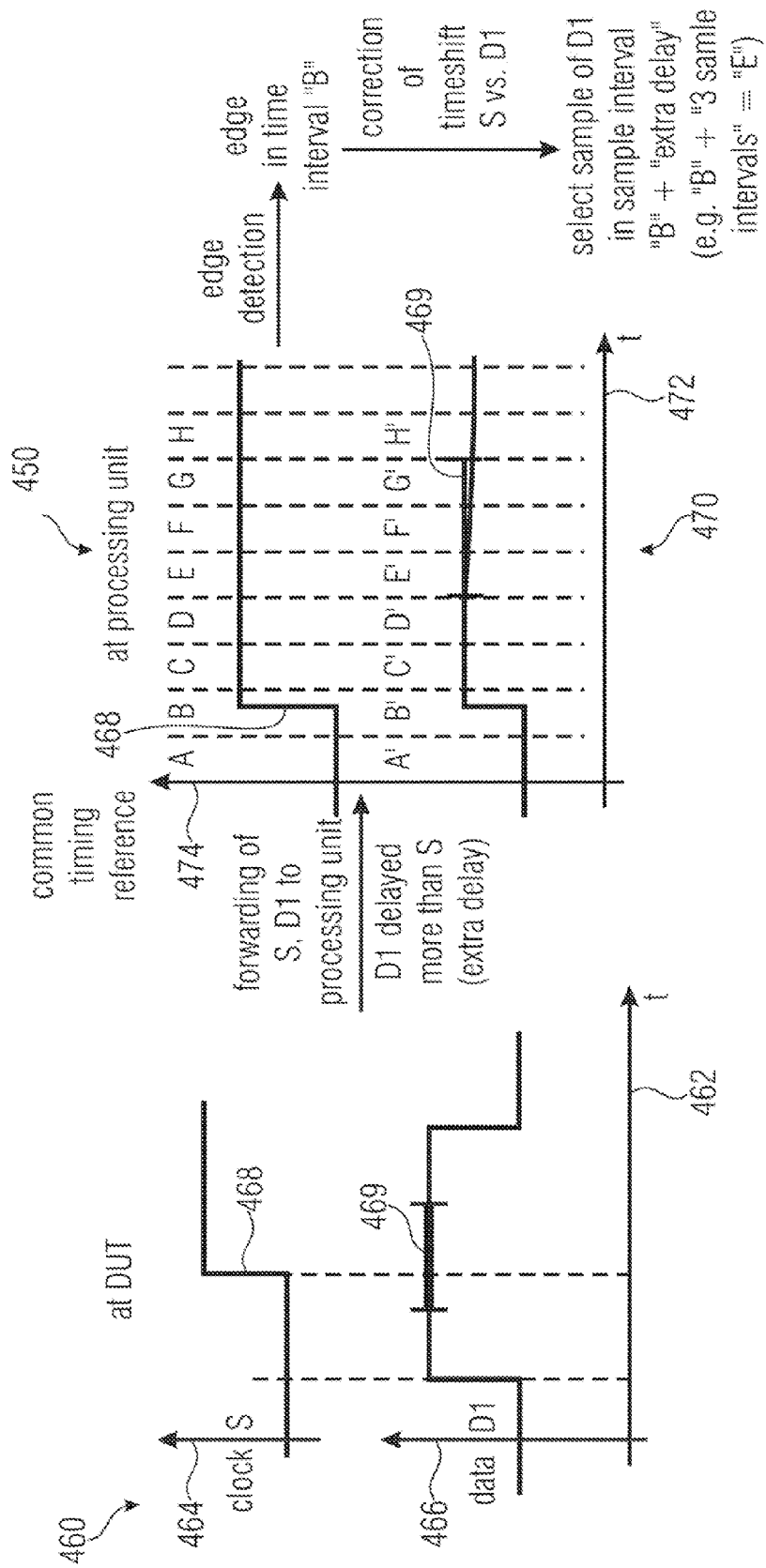
Figure 4C:
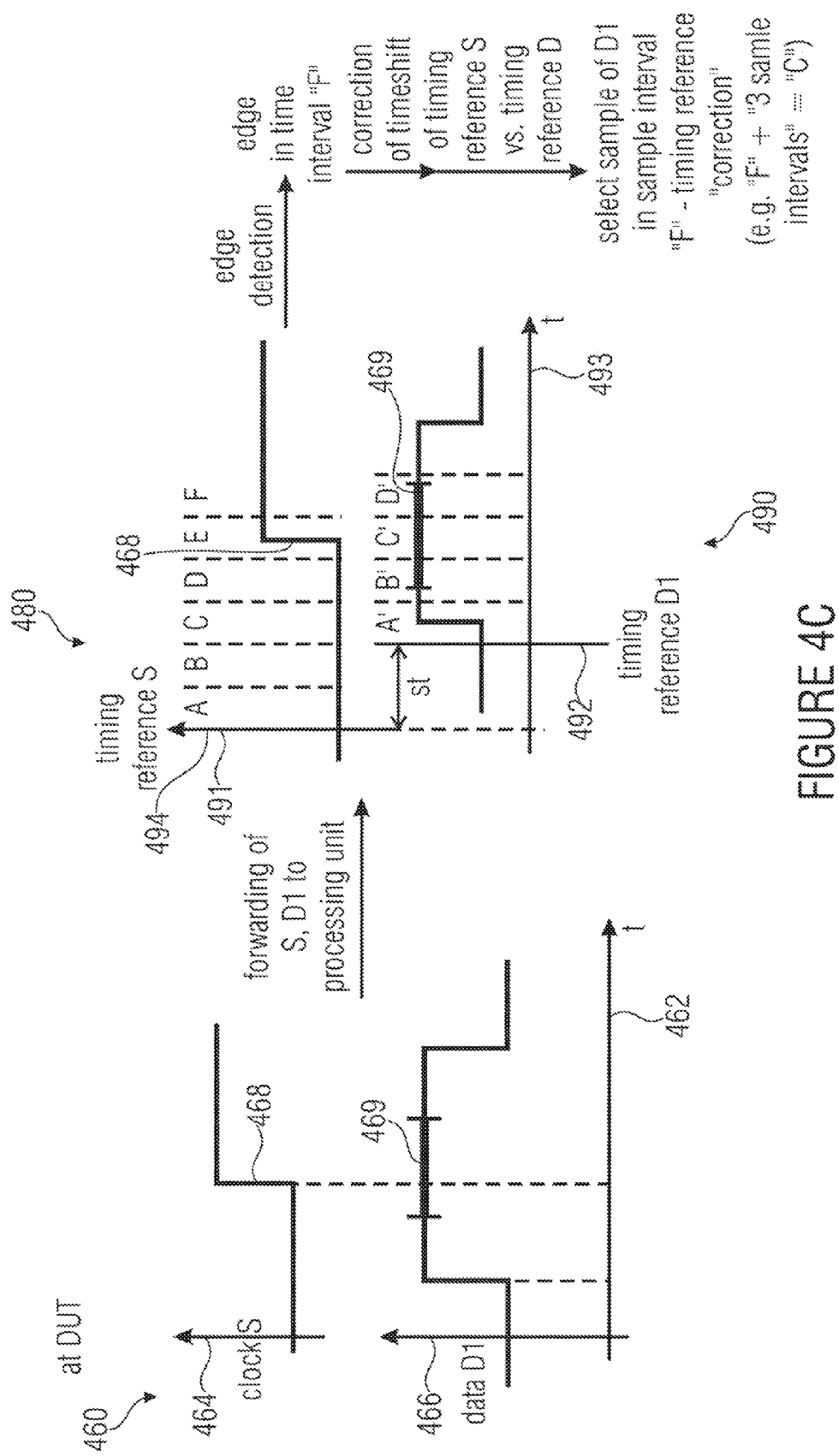

FIGS. 4a to 4c show a schematic representations of the sampling of a clock or strobe signal S and a data signal D1. FIGS. 4a to 4c also show the transition detection of the clock-or-strobe signal S, and the forwarding of the digitized clock-or-strobe time information in order to select data from a sequence of data samples of the data signal D1.

In the embodiment shown in FIG. 4a, a clock or a strobe signal S may be 8-fold over-sampled, i.e. a sampling interval 40 comprises a sequence of 8 samples, for example taken in 8 subsequent time intervals A-H, containing or representing the digitized or sampled clock or strobe signal S (or a period thereof). A time reference 45 for the sampling period 40 may be provided by a master clock, which master clock is not shown in FIG. 4a.

The same applies to the data signal D1, which may also be 8-fold over-sampled to obtain a sequence of 8 data samples in time intervals A'-H', which time intervals A'-H' may or may not be identical to the time intervals A-H. In some embodiments, a temporal synchronization is provided, such that there is a predetermined temporal relationship between the time intervals A-H and A'-H'. However, in some embodiments there may be a time shift between time intervals A-H and A'-H', for example due to propagation delays in the distribution of a synchronization signal. In other embodiments, time intervals A-H and A'-H' may be concurrent.

The clock or strobe signal S and the data signal D1 may be analog signals or digital bit streams. One bit of such a bit stream may be n-times over-sampled ($n \geq 2$), for example 8-fold, as it is shown in FIG. 4.

The clock or strobe signal S may perform a transition 46 from a low state to a high state during the sample time interval B. This transition is indicated by the arrow 42 and may be detected by the transition detection unit 22c. For example, the transition detection unit 23c may find that the transition 46 occurs during the j-th sample, relative to the (repetitive) timing reference 45. In the given example, the transition detection unit may find, on the basis of an analysis of the samples of the signal S, that the transition occurs during the second sample interval "B" after the timing reference 45. Consequently, the transition detection unit may provide a digitally encoded information describing the temporal position of the transition 46 relative to the (typically repetitive or periodic) timing reference 45, to obtain the digitized clock or strobe time information. In the given example, the digitized clock or strobe time information may encode the value j, for example j=2.

In an embodiment, the bit history unit 22b may be configured to cooperate with the first sampling unit 22a such that a position, at which bits provided by the first sampling unit 22a are stored in the bit history unit 22b, is dependent on a relative timing relationship between the bits provided by the first sampling unit and the timing reference. For example, the bit history unit may be configured to take over bits provided by the sampling unit 22a in response to the timing reference. Alternatively, an evaluation of the bits stored in the bit history unit 22b (for example by the transition detection unit) may be triggered in response to the timing reference.

The digitized clock or strobe time information obtained by the transition detection 22c may then be forwarded as a digital word, for example as a discrete binary coded value, to the data select unit (not shown in FIG. 4). Depending on the digitized clock or strobe time information, from the sequence of data samples, the data sample B is selected 44 as data E1.

In a source-synchronous bus of a DUT, a strobe signal S may be transferred together with a data signal in order to indicate for example valid data. In this case the strobe time can be digitized and transmitted. In subsequent steps the digital strobe time can be used to select data from a choice of data samples of the data signal, or to indicate to another device, for example an evaluating unit or a tester, which data sample is valid and represents the correct value of the data signal.

In the following, a situation will be described in which a data signal D1 is time shifted with respect to a corresponding clock signal S at a processing unit. FIG. 4b shows a schematic representation of such a situation. The graphical representation of FIG. 4b is designated in its entirety with 450. The graphical representation 450 shows a first representation 460 of the clock signal S and the data signal D1 at a source, for example, at a device-under-test. An abscissa 462 describes a time and ordinates 464, 466 describe a state of the signals S, D1. As can be seen, an edge 468 of the clock-or-strobe signal S occurs in the presence of stable data of the data signal D1, for example, in a proximity of a central portion of a bit. Thus, the edge 468 of the clock-or-strobe signal S indicates the presence of valid data D1 at the source, e.g. device-under-test. Further, it is assumed that both the clock-or-strobe signal S and the data signal D1 are forwarded to the processing unit. However, it is assumed that, for example, the data signal D1 is delayed more than the clock-or-strobe signal S. This may, for example, be caused by a different length of routing resources for routing the signals S, D1 from the source to the processing unit.

FIG. 4b shows a graphical representation 470 representing both the signal S and the signal D1 as sampled at the processing unit. It will be assumed here, for the sake of simplicity, that the first sampling unit 22a and the second sampling unit 24a comprise a common timing reference. An abscissa 472 describes the time, and an ordinate 474 describes levels or values of the signals S, D1 as seen at the processing unit 20. For example, an extra delay introduced to the data signal D1 when compared to the delay introduced to the clock-or-strobe signal S when forwarding the signals S, D1 from the source to the processing unit may cause that the edge 468 of the signal S does not coincide with a central portion 469 of the data signal D1 at the processing unit, as can be seen from the graphical representation 470. Assuming now that samples of the clock-or-strobe signal S are taken in time intervals A, B, C, D, E, F, G, H (the time intervals being defined relative to the common timing reference), an edge detection can be performed, for example, by the transition detection unit 22c. The edge detection unit may, for example, indicate that an edge occurs in the time interval "B".

Assuming further that the data signal D1 is sampled at time intervals A', B', C', D', E', F', G', H', relative to the common timing reference, wherein A=A', B=B', . . . , it can be seen that sample values in concurrent time intervals are not associated with corresponding points of the signals S, D1 at the source (device-under-test). Rather, a correction may be needed. For example, it can be seen from FIG. 4b that the sample value of the clock-or-strobe signal S taken in the time interval B corresponds to the sample value of the data signal D1 taken in the time interval F'. Accordingly, a correction can be made. For this purpose, the transition detection unit 22c may provide a digitally encoded value or information indicating that the edge of the signal S occurs in the time interval B. This information may be forwarded from the transition detection unit 22c to the correction unit 30. The correction unit 30 may be configured to translate the information designating the time interval B, obtained from the transition detection unit 22c, into an information designating the time interval F'. For example, the correction unit 30 may simply increase the digitized value designating the time interval B "by four time intervals" (for example, by a value of four), such that the corrected information 31 designates the time interval F'. For example, if integer numbers 1, 2, 3, 4, 5, 6, 7, 8 are associated with the time intervals A, B, C, D, E, F, G, H, then the corrector 30 may simply add a value of four to the value obtained from the transition detection 22c, to translate a transition time information designating the time interval B into a transition time information designating the time interval F'. In other words, if the sample time intervals are designated with numerical values, a simple addition or subtraction operation may be used to perform the correction.

The multiplexer 24c may, for example, select the sample value of the data signal D1 in the time interval F' as the selected data E1 in response to the corrected transition time information 31 provided by the correction unit 30.

A proper setting of the correction unit 30 may, for example, be obtained in a calibration procedure. For example, if a calibration is performed, which allows the extraction of the time shift between S and D1 introduced by the forwarding of the signals S and D1 from the source (device-under-test) to the processing unit, a correction value may be extracted therefrom.

In the following, a situation in which the time references for the sampling of the clock-or-strobe signal S and for the sampling of the data signal D1 are shifted with respect to each other, will be described taking reference to FIG. 4c. FIG. 4c shows a graphical representation 480 depicting this situation. The graphical representation 460 describes signals at the device-under-test. At the device-under-test, the timing of the signals may be identical to the timing as depicted in the graphical representation 460 of FIG. 4b. The graphical representation 490 describes a timing of the signals S, D1 at the processing unit. For the sake of simplicity, it will be assumed here that no timing shift between the signals S and D1 is introduced by the forwarding of said signals from the source (for example, the device-under-test) to the processing unit. However, it is assumed that a time shift exists between a timing reference 491 of the sampling of the signal S and a timing reference 492 of the sampling of the signal D1. For example, the signal S may be sampled in a different chip when compared to the signal D1. Consequently, a time shift may be introduced, for example, if a master clock signal at the first chip (where the clock-or-strobe signal is sampled) is shifted in time with respect to the master clock at the second chip (where the data signal is sampled).

Taking reference now to the graphical representation 490, an abscissa 493 describes a time, and an ordinate 494 describes the sampled values of the signals S, D1. Taking reference to the graphical representation 490, an edge detection on the basis of the samples of the clock-or-strobe signal S may indicate that an edge 468 is present in a sample interval E. However, the sample interval E of the clock-or-strobe signal S does not correspond to the sample interval E' of the data signal D1 due to the shift of the timing reference for the sampling of the signals S and D1. Thus, the sample interval E of the clock signal S rather corresponds to the sample interval C' (referenced to the timing reference for a sampling of D1).

Accordingly, the correction unit 30 may receive a transition time information indicating that the edge was detected in the sample interval E of the clock-or-strobe signal S, and the correction unit 30 may provide a corrected indication, indicating to select a bit sampled in the sample interval C' of the data signal D1 as the selected data E1.

For example, if the sampled intervals are designated by integer numbers, the sample interval E may be represented by the integer number of 5 (with the sample interval A being represented by the integer number 1). The sample interval C' may, for example, be represented by the integer number 3, with the sample interval A' being represented by the integer number 1. Thus, the correction unit 30 may receive the integer number 5 (representing the sample interval E) and subtract the integer of 2 from the received value, to obtain a value of 3, representing the sample interval E' of the data signal D1.

To summarize the above, a concept has been described taking reference to FIGS. 4a to 4c, which allows for a digital representation of a point-in-time in which an edge occurs. The digital information, which may represent a time of the edge with reference to first (for example repetitive) timing reference may be transferred, as the transition time information, to a correction unit 30. The correction unit 30 may amend the received transition time information such as to select an appropriate sample of the data signal. The digitally encoded transport of the transition time information allows for a particularly reliable transfer and for a simple correction (for example, by adding or subtracting a correction value to or from the transition time information). Both are propagation delay differences between the signal S and the signal D1 and a time shift of the timing references for the sampling of the signals S and D1 (or for the processing of the samples) may be corrected by the correction unit 30.

In some embodiments, the correction unit 30 may optionally be used to correct for the propagation delay of the transfer of the digitized clock-or-strobe time information from the time information provider to the data extraction unit. For example, a transfer of the digitized clock-or-strobe time information from the time information provider to the one or more data extraction units may need, for example, one or more periods of the first sampling frequency $f_{s1}$, or of the second sampling frequency $f_{s2}$. Accordingly, the correction unit may be used to compensate for this propagation delay. Also, if the propagation times for the digitized clock-or-strobe time information between the time information provider and a plurality of data extraction units are different, the correction units 30 of the data extraction units may be set to different values.

In some embodiments, the correction unit may optionally be used to (or configured to) provide a pre-trigger functionality. Thus, a sample of the data signal D1 may be selected as the output data E1 (in response to a corresponding setting of the correction unit 30), such that the selected sample of the data signal describes a status of the data signal temporally before the occurrence of the corresponding transition on the clock-or-strobe signal.

Figure 5:
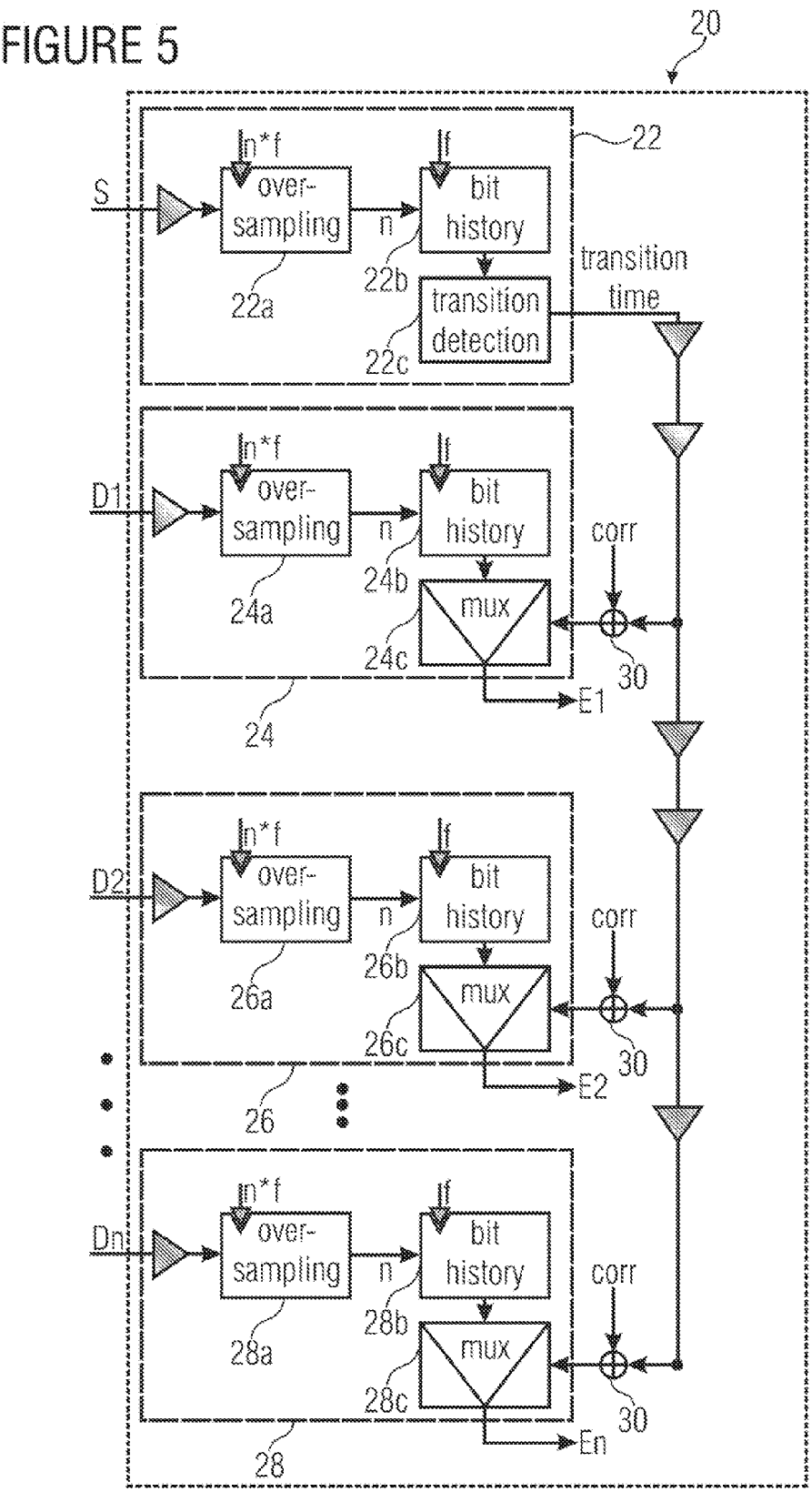
FIG. 5 shows a block schematic diagram of a data processing unit comprising several data signals according to another embodiment according to the invention.

Another embodiment according to the present invention is depicted in FIG. 5. As already mentioned above, the data processing unit 20 may comprise a plurality of data extraction units 24, 26, 28 coupled to the time information provider 22 and configured to select data from a plurality of sequences of data samples of a plurality of data signals D1, D2, . . . Dn depending on the digitized clock-or-strobe time information. Each of the data extraction units 24, 26, . . . , 28 may be coupled to the time information provider 22 as described above. The data extraction units 24, 26, 28 may be formed as described taking reference to FIG. 3. This means that the reference numerals 26a,b,c and 28a,b,c correspond to 24a,b,c.

Integrated circuits or devices may comprise up to several hundred data signals (for example, external data signals), which may, for example, form different busses or links with defined strobe or clock signals. In order to test such electronic devices, a tester may also comprise several hundred test channels. One or more of the tester channels may comprise time information providers and/or data extraction units. A tester or ATE may therefore comprise one or more data processing units, as described above.

In some embodiments, a single unit may be configured to be switchable to operate as a time information provider or as a data extraction unit. For example, a combined unit may comprise a sampling unit (for example a sampling unit 22a) and a bit history unit (for example a bit history unit 22b) coupled to the sampling unit (for example as described above). Moreover, the combined unit may comprise a transition detection (for example a transition detection 22c) and a multiplexer (for example a multiplexer 24c). In the combined unit, the transition detection and the multiplexer may be coupled to a common bit history unit. Thus, if the transition detection of the combined unit is active, the combined unit may serve as a time information provider. Further, if the multiplexer of the combined unit as active, the combined unit may serve as a data extraction unit. Accordingly, the combined unit may provide a maximum flexibility, such that a channel, to which the combined unit is coupled, may selectively operate as a clock-or-strobe channel or as a data channel.

Taking reference to FIG. 5, the time information provider 22 may provide the transition time information (or digitized clock-or-strobe time information) on the basis of the signal S. The transition time information may be provided to a plurality of data extraction units 24, 26, 28. As the transition time information is, in some embodiments, an encoded digital value, the data extraction units 24, 26, 28 may all receive the same transition time information, irrespective of whether a propagation delay of the transition time information varies for the different data extraction units 24, 26, 28. This advantage is achieved in that the transition time information is encoded independent from an actual timing of the transition time information, but is rather represented by a digital value.

The different data extraction units 24, 26, 28 may each apply individual correction values to the common transition time information received from the timing information provider 22. Naturally, identical correction values could also be applied. Also, rather than distributing a common transition time information to the data extraction units 24, 26, 28, individually corrected transition time information could be provided by the time information provider 22 for the different data extraction units 24, 26, 28.

Figure 6:
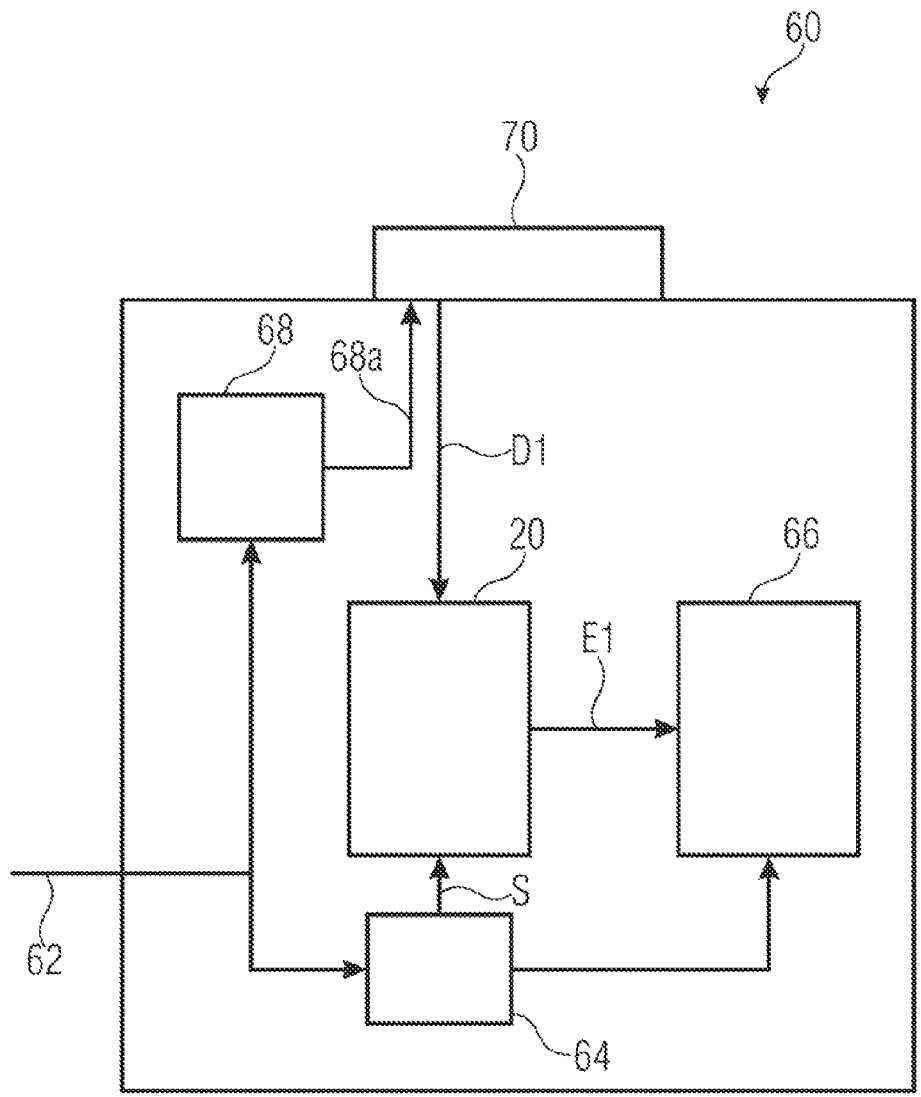
FIG. 6 shows a block diagram of a tester for testing a device under test, according to an embodiment according to the invention.

FIG. 6 shows a block schematic diagram of a tester, according to an embodiment. In FIG. 6, a tester 60 for testing a device under test (DUT) comprises a master clock signal 62, which may be generated internally or may be fed to the tester externally. In addition, the tester 60 may comprise a strobe signal generator 64, a comparator unit 66, a DUT clock generator 68, a DUT interface 70 and the data processor unit 20, as described above. The tester 60 may be configured such that the strobe signal generator 64 generates a strobe signal for the data processing unit 20 on the basis of the master clock signal 62. The DUT clock generator generates a DUT clock signal 68a, coupled to the DUT interface 70, on the basis of the master clock signal 62. The data processing unit 20 may be coupled, via at least one data signal line, to the DUT interface 70, to receive the data signal D1. In addition, the data processing unit 20 can be coupled to a comparator unit 66. The comparator unit 66 may be configured to compare the selected data from the data processing unit 20, as described above, with expected data. The comparator unit 66 may furthermore be able to provide a test result based on the comparison of selected data with expected data. In this embodiment the strobe signal generator 64 is configured to adjustably shift a timing of the strobe signal S in relation to the master clock signal 62.

In embodiments, the strobe signal generator 64 and/or the DUT clock generator 68 may include a frequency divider or an adjustable delay line in order to time-shift the DUT clock signal 68a and/or the clock-or-strobe signal S relative to the master clock signal to generate a DUT clock signal and/or a strobe signal S.

In some embodiments, the frequency of the DUT clock signal 68a or the frequency of the clock-or-strobe signal S may be different from the frequency of the master signal.

Taking reference to FIG. 6, a very precise selection of a sample value of the signal D1 can be obtained. For example, a transition time information may be obtained (in the form of a digital value) on the basis of the clock-or-strobe signal S. Accordingly, a selection of a sample of the signal D1 can be controlled, as described taking reference to FIGS. 3 and 4.

Figure 7:
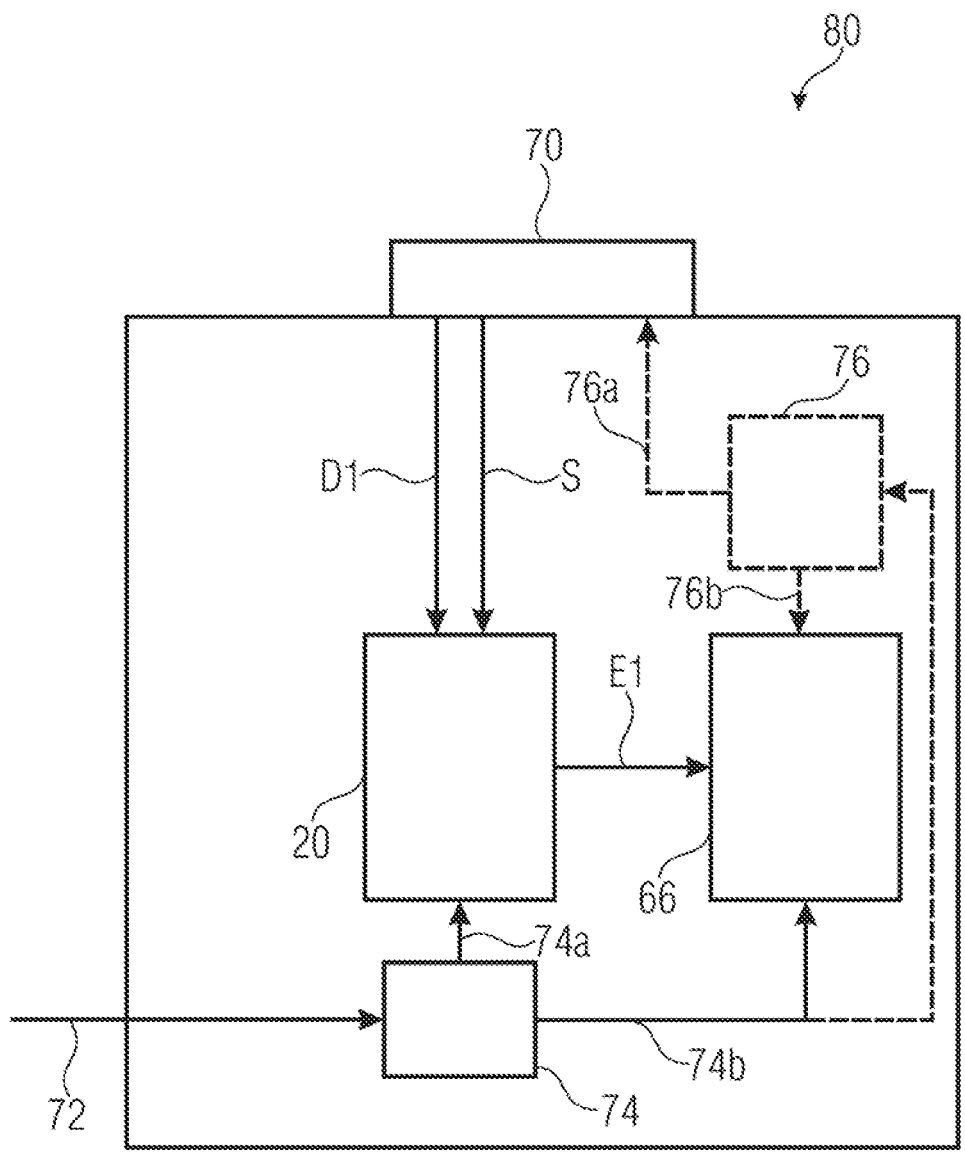
FIG. 7 shows a block diagram of a tester for testing a device under test, according to another embodiment according to the invention.

FIG. 7 shows a block schematic diagram of a tester for testing a device, according to an embodiment of the invention. The tester 80 may comprise a comparator unit 66 and a data processing unit 20, as described above. The data processing unit 20 is coupled to the DUT interface 70 to receive from the DUT interface 70 the data signal D1 and the clock-or-strobe signal S and to provide selected data E1. The comparator unit 66 is configured to compare the selected data E1 from the processing unit 20 with expected data and to provide a test result based on the comparison of the selected data with the expected data.

The tester may furthermore optionally comprise a master clock 72 and a timing circuit 74.

The timing circuit 74 may, for example, be configured to provide one or more timing reference signals 74a to the processing unit 20, for example, to adjust the timing reference for sampling the signals S and D1. Moreover, the timing circuit 74 may optionally provide a timing signal 74b to the comparator unit 66.

In another embodiment of the present invention, the tester may comprise at least one phase-locked loop (PLL) or delay-locked loop (DLL) in order to generate the test clock signal or a clock signal for the data processing unit.

The tester 60 may furthermore (optionally) comprise a data generator 76 coupled to the DUT interface 70 and to the comparator unit 66. The data generator unit may be configured to generate data signal 76a (for example, as a stimulus for a device-under-test) and to provide the data signals to the DUT interface. Also, the data generator may be configured to generate information 76b regarding the expected data. In the embodiment shown in FIG. 7, a device-under-test connected to the tester 80 via the device-under-test interface 70 may provide both a strobe signal S and a data signal D1 to the data processing unit 20. The data processing unit 20 may be configured to output extracted data E1 on the basis of the data signal D1. The strobe-or-clock signal S may be used to determine, which sample of the data signal D1 is used to obtain the extracted signal E1. Thus, a source-synchronous data communication can be established, the timing of which is determined by the device-under-test.

In general, a tester (for example, the tester 80) may comprise a data processing unit (20) with a data strobe-or-clock channel (for example, the time information provider 22) and a data channel (for example, the data extractor 24) each of them over-sampled (e.g. using the sampling units 22a, 24a) and configured to feed pipelines (e.g. the bit history units 22b, 24b) with the over-sampled bit history of the respective bitstream. A two-fold or higher over-sampling may be used to provide enough choices for the safe extraction of valid information or data. The transition time information (for example, of a clock or strobe time signal) is extracted from the over-sampled bit history of the data strobe signal and forwarded as a digital word. Data (for example, valid data) is extracted from the over-sampled bit history (for example, of the data signal) at a point in time that corresponds to the forwarded transition time of the data strobe signal. As it is described in the context of FIG. 3, an individual signal skew can be corrected optionally using a correction unit. That is, the correction unit can, for example, compensate the different propagation delays for each of the data signals in an individual way, such that valid data and the clock-or-strobe transition time information fit together.

Figure 8:
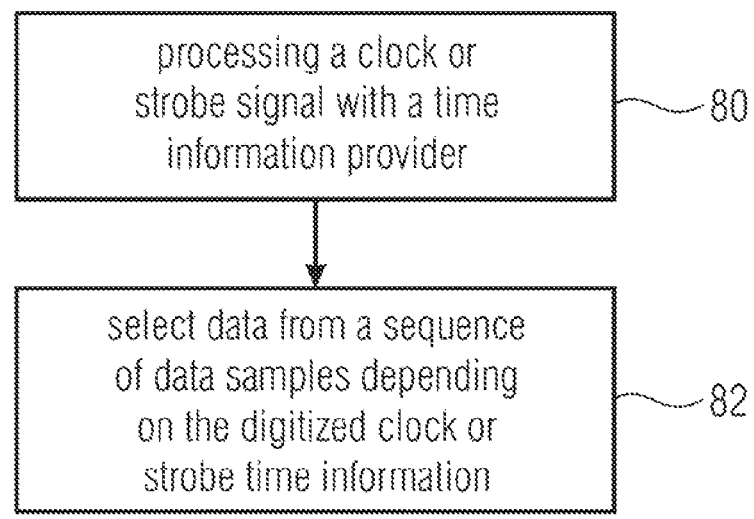
FIG. 8 shows a flowchart depicting a method of processing data, according to an embodiment according to the invention.

FIG. 8 shows a flow chart of a method of processing data. The method comprises processing 80 a clock-or-strobe signal, to provide a digitized clock-or-strobe time information on the basis of the clock or strobe signal, and selecting 82 data from a sequence of data samples of a data signal depending on the digitized-clock-or strobe time information.

The processing 80 may be performed in such a way that the clock or strobe signal is sampled with a first sampling frequency $f_{s1}$ which is n times higher than a maximum frequency $f_{max1}$ of the clock or strobe signal. The sampling frequency $f_{s1}$ may be n-times higher than a first bandwidth frequency $f_{band1}$ of the clock-or-strobe signal if the clock-or-strobe signal is an analog signal. The selection 82 of data from a sequence of data samples of a data signal may include sampling the data signal with a second sampling frequency $f_{s2}$, which is m-times higher than a maximum frequency or data rate $f_{max2}$ of the data signal. The second sampling frequency $f_{s2}$ may be m-times higher than a maximum bandwidth frequency $f_{max2}$ of the data signal (n and m≥2). The sampling of the clock-or-strobe signal and of the data signal may be performed with the same sampling frequency, i.e. $f_{s1}=f_{s2}$. In other words, the sampling rates for the sampling or over-sampling of the clock-or-strobe signal and of the at least one data signal may be equal.

Figure 9:
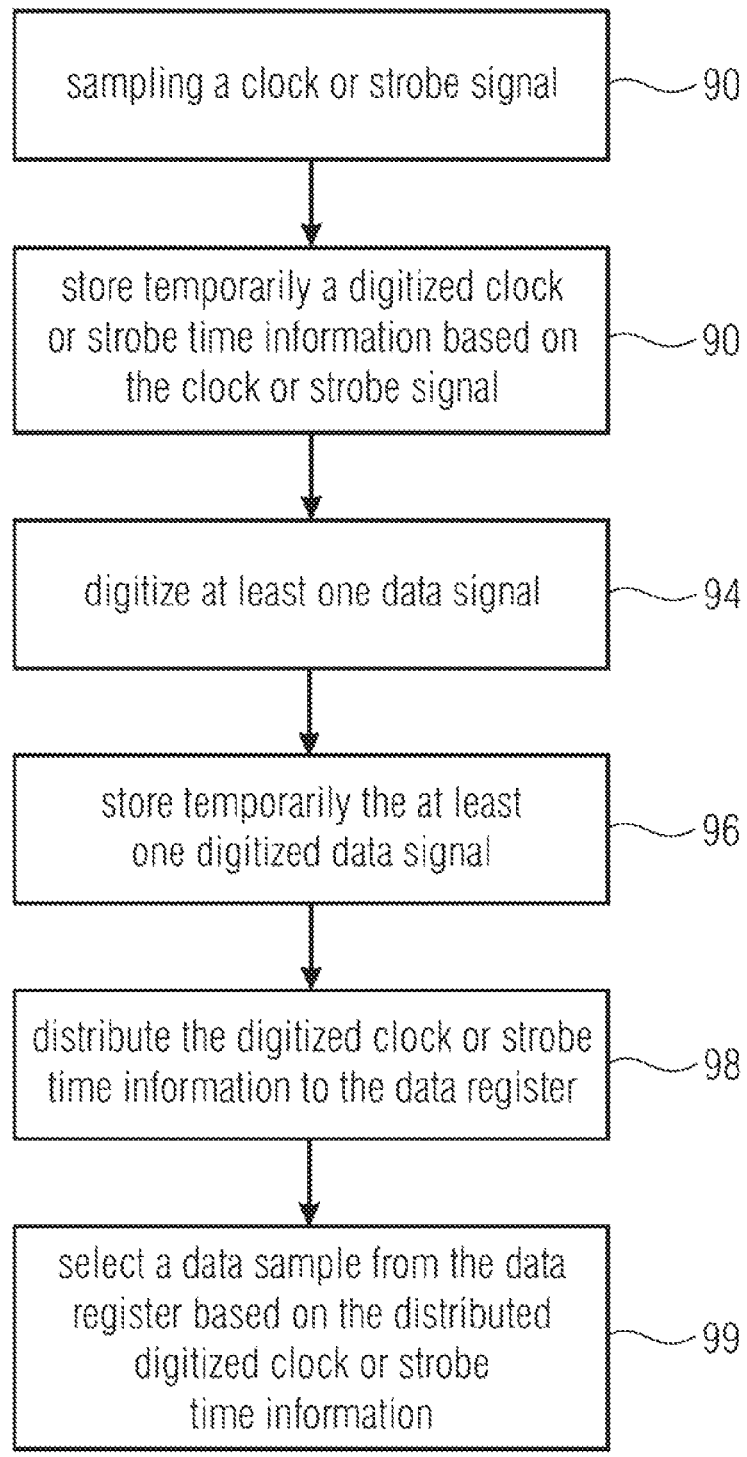
FIG. 9 shows another flowchart of a method of processing data, according to an embodiment according to the invention.

The method of processing data may comprise, as it is schematically shown in the flow chart of FIG. 9, sampling or digitizing a clock-or-strobe signal 90, temporarily storing 92 the sampled clock-or-strobe time information (STI), which clock-or-strobe time information is based on the clock or strobe signal, and sampling at least one data signal 94. The method may further comprise temporarily storing the sampled data signal 96, distributing the digitized clock or strobe time information 98 and selecting 99 a data sample of the data signal based on the distributed digitized clock or strobe time information.

In some embodiments, the method of processing data may comprise sampling a clock or strobe signal and temporarily storing a sampled clock-or-strobe time information based on the clock-or-strobe signal, for example, in a register. Furthermore, the method comprises sampling at least one data signal, temporarily storing data samples from the at least one sampled data signal, and selecting data samples temporarily stored, based on (or independence on) the clock-or-strobe time information.

In a further embodiment, the method may comprise distributing the digitized clock-or-strobe time information to at least one data select unit in order to select a data sample from the data signal.

Using the method of processing data, a propagation delay compensation between one or more (different) data signals and the strobe-or-clock signal can be achieved by sampling the respective signals and forwarding or distributing a strobe point-inactive, coded as a digital word.

The method of processing data may be performed in such a way that a clock-or-strobe time or a data signal is sampled depending on the clock-or-strobe signal. This means that, the clock or strobe signal determines the sampling time.

In another embodiment, the sampling of the clock or strobe signal and the data signals is performed in relation to a time reference provided by a master clock.

The invention can alternatively or in addition be partly or entirely embodied or supported by one or more suitable computer programs which can be stored on or otherwise provided by any kind of data carrier, and which might be executed in or by an suitable data processing unit, for example a computer. The methods as described above of processing data can be performed when a computer program runs on a computer.

Embodiments of the present invention reveal that, instead of strobing data signals directly, a strobe time is digitized, transmitted and used to select data from a choice of digitized data samples. The transition time information can be forwarded in a daisy chain or by other means, for example in a parallel or serial manner. The transport of the digitized strobe time information—the transition time may need multiple pipeline clocks (instead of the vertical buffers).

Embodiments according to the invention comprise the following method: Digitize Strobe time; transmit strobe time; use digitized strobe time to select data from a choice of data samples.

In other embodiments of the present invention, a data strobe channel and data are each over-sampled and feed pipelines with over-sampled bit history. An over-sampling which is, for example, at least two times higher than the bit rate of a bitstream representing the clock or strobe signal or the data signal ("2× or higher over-sampling") provides enough choices for safe extraction of valid information. A transition time information (for example the digitized clock or strobe time information) is extracted from the over-sampled bit history of the data strobe signal and forwarded as a digital word. Data is extracted from their over-sampled bit histories at a point in time that corresponds to the forwarded transition time of the data strobe signal, optionally corrected for individual signal skew. The point in time that corresponds to the forwarded transition time of the data strobe signal can be optionally corrected individually for each data signal.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concept disclosed herein and comprehended by the claims that follow.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A data processing unit, comprising:
   a time information provider including,
      a first sampling unit configured to sample a clock-or-strobe signal,
      a first bit history unit, coupled to the first sampling unit, and configured to temporarily store a sequence of samples of the clock-or-strobe signal, and
      a transition detection unit, coupled to the first bit history unit, and configured to detect a transition in the sequence of samples to acquire a digitized clock-or-strobe time information on the basis of the sequence of samples of the clock-or-strobe signal; and
   at least one data extraction unit, coupled to the time information provider, including,
      a second sampling unit configured to sample a data signal to acquire data samples of the data signal,
      a second bit history unit, coupled to the second sampling unit, and configured to temporarily store a sequence of the data samples of the data signal, and
      a data selection unit, coupled to the second bit history unit, and configured to select data from the temporarily stored sequence of the data samples of the data signal depending on the digitized clock-or-strobe time information provided by the transition detection unit;
   wherein the clock-or-strobe signal is physically different from the data signal;
   wherein the time information provider comprises a time-to-digital converter configured provide, as the digitized clock-or-strobe time information, a digitized time stamp describing a time of a transition of the clock-or-strobe signal, and
   wherein the digitized clock or strobe time information is represented as a multi-bit value encoding the clock or strobe time information or
   wherein the digitized clock-or-strobe time information is represented as an increment-decrement-information, wherein the increment-decrement-information describes a difference between a timing of a currently detected transition of the clock-or-strobe signal and a timing of a previous transition of the clock-or-strobe signal.

2. The data processing unit according to claim 1, wherein the first and the second sampling units are configured to sample the clock-or-strobe signal and the data signal with the same sampling rate.

3. The data processing unit according to claim 1, wherein the digitized clock-or-strobe time information is represented by one or more discretely coded values.

4. The data processing unit according to claim 1, wherein the data processing unit is configured to transfer the digitized clock-or-strobe time information from the time information provider to the data extraction unit synchronized with a master clock.

5. The data processing unit according to claim 1, wherein the data processing unit is configured to transfer the digitized clock-or-strobe time information from the time information provider to the data extraction unit asynchronously with respect to a master clock.

6. The data processing unit according to claim 5, wherein the correction unit is further configured to compensate, at least partially, buffer delays in a data path of the data signal.

7. The data processing unit according claim 1, wherein the data processing unit is configured to transfer the digitized clock-or-strobe time information from the time information provider to the data extraction unit only once per I periods of the clock-or-strobe signal, wherein I>1.

8. The data processing unit according to claim 1, wherein the data processing unit is configured to transfer the digitized clock-or-strobe time information from the time information provider to the data extraction unit only once per J data positions of the data signal, wherein J>1.

9. The data processing unit according to claim 1, wherein the at least one data extraction unit is coupled to a correction unit configured to influence the selection of data from the sequence of data samples of the data signal.

10. The data processing unit according to claim 1, wherein the at least one data extraction unit is coupled to a correction unit configured to influence the selection of data from a sequence of data samples of the data signal, such that a propagation delay difference between the clock-or-strobe signal and the data signal is at least partially compensated or such that a propagation delay of the digitized clock-or-strobe time information is at least partially compensated.

11. The data processing unit according to claim 1, wherein the at least one data extraction unit is coupled to a correction unit configured to change the digitized clock-or-strobe time information to acquire a changed digitized clock-or-strobe time information, and wherein the data processing unit is configured to use the changed digitized clock-or-strobe time information to select data from a sequence of data samples of the data signal;
   wherein the correction unit is configured to change the digitized clock-or-strobe time Information in such a way that a propagation delay difference between the clock-or-strobe signal and the data signal is compensated.

12. The data processing unit according to claim 1, wherein the at least one data extraction unit is coupled to the time information provider in a daisy chain, in a parallel configuration or in a serial configuration, in order to acquire the digitized clock-or-strobe time information.

13. The data processing unit according to claim 1, further comprising a clocked pipeline or a plurality of buffers to forward the digitized clock-or-strobe time information from the information provider to the at least one data extraction unit.

14. The data processing unit according to claim 1, wherein the time information provider comprises a plurality of flip-flops to temporarily store the sequence of samples of the clock-or strobe signal, and
   wherein the at least one data extraction unit comprises a plurality of flip-flops to temporarily store the sequence of data samples.

15. The data processing unit according to claim 1, wherein the time information provider is configured to forward the digitized clock-or-strobe time information to the at least one data extraction unit as a digital word.

16. The data processing unit according to claim 1, wherein the first and the second sampling units are clocked with a n-fold frequency compared to the first and the second bit history units, and
the first and the second bit history units are configured to temporarily store at least the respective n-fold samples of the clock-or-strobe signal or data signal; and
n is larger than one.

17. The data processing unit according to claim 1, wherein at least one data extraction unit comprises a multiplexer configured to select data from the sequence of data samples of the data signal depending on a multiplexer selection information, and wherein the multiplexer selection information is based on the digitized clock-or-strobe time information, or wherein the multiplexer selection information is a function of the digitized clock-or-strobe time information.

18. The data processing unit according to claim 1, wherein the clock or strobe signal and the data signal are bit streams.

19. The data processing unit according to claim 1, wherein clock-or-strobe signal and the data signal are source-synchronous signals.

20. A tester for testing a device-under-test, the tester comprising:
a master clock signal;
a strobe signal generator;
a device-under-test interface;
a data processing unit comprising:
a time information provider including,
a first sampling unit configured to sample a clock-or-strobe signal,
a first bit history unit, coupled to the first sampling unit, and configured to temporarily store a sequence of samples of the clock-or-strobe signal, and
a transition detection unit, coupled to the first bit history unit, and configured to detect a transition in the sequence of samples to acquire a digitized clock-or-strobe time information on the basis of the clock-or-strobe signal; and
at least one data extraction unit, coupled to the time information provider, including,
a second sampling unit configured to sample a data signal to acquire data samples of the data signal,
a second bit history unit, coupled to the second sampling unit, and configured to temporarily store a sequence of the data samples of the data signal, and
a data selection unit, coupled to the second bit history unit, and configured to select data from the temporarily stored sequence of the data samples of the data signal depending on the digitized clock-or-strobe time information provided by the transition detection unit;
wherein the clock-or-strobe signal is physically different from the data signal;
wherein the time information provider comprises a time-to-digital converter configured to provide, as the digitized clock-or-strobe time information, a digitized time stamp describing a time of a transition of the clock-or-strobe signal,
wherein the digitized clock or strobe time information is represented as a multi-bit value encoding the clock or strobe time information or
wherein the digitized clock-or-strobe time information is represented as an increment-decrement-information, wherein the increment-decrement-information describes a difference between a timing of a currently detected transition of the clock-or-strobe signal and a timing of a previous transition of the clock-or-strobe signal; and
a comparator unit;
wherein the tester is configured such that the strobe signal generator generates a strobe signal for the data processing unit on the basis of the master clock signal; and
wherein the data processing unit is coupled, via at least one data signal line, to the device-under-test interface, to receive the data signal from a device-under-test;
wherein the data-processing unit is configured to provide the selected data from the sequence of data samples of the device-under-test data signal in response to the strobe signal; and
wherein the comparator unit is configured to compare the selected data provided by the data processing unit with expected data, and to provide a test result based on the comparison of the selected data with the expected data.

21. The tester for testing a device under test according to claim 20, wherein the strobe signal generator is configured to adjustably shift a timing of the clock-or-strobe signal in relation to the master clock signal.

22. The tester according to claim 20, wherein the strobe signal generator comprises a frequency divider, a frequency multiplier, a phase-locked-loop (PLL), a delay-locked-loop (DLL) or an adjustable delay line.

23. The tester for testing a device-under-test according to claim 20, wherein the tester is configured to perform the sampling of the clock-or-strobe signal and the sampling of the data signal in dependence on one or more timing responses defined by a master clock signal generated in the tester or provided to the tester, and wherein the digitized clock-or-strobe time information describes a timing of the clock-or-strobe signal relative to the master clock signal.

24. A tester for testing a device under test (DUT), the tester comprising;
a comparator unit;
a device-under-test (DUT) interface; and
a data processing unit comprising:
a time information provider including,
a first sampling unit configured to sample a clock-or-strobe signal,
a first bit history unit, coupled to the first sampling unit, and configured to temporarily store a sequence of samples of the clock-or-strobe signal, and
a transition detection unit, coupled to the first bit history unit, and configured to detect a transition in the sequence of samples to acquire a digitized clock-or-strobe time information on the basis of the sequence of samples of the clock-or-strobe signal; and
at least one data extraction unit, coupled to the time information provider, including
a second sampling unit configured to sample a data signal to acquire data samples of the data signal,
a second bit history unit, coupled to the second sampling unit, and configured to temporarily store a sequence of the data samples of the data signal, and
a data selection unit, coupled to the second bit history unit, and configured to select data from the temporarily stored sequence of the data samples of the data signal depending on the digitized clock-or-strobe time information provided by the transition detection unit;
wherein the clock-or-strobe signal is physically different from the data signal;

wherein the time information provider comprises a time-to-digital converter configured provide, as the digitized clock-or-strobe time information, a digitized time stamp describing a time of a transition of the clock-or-strobe signal, wherein the digitized clock or strobe time information is represented as a multi-bit value encoding the clock or strobe time information or wherein the digitized clock-or-strobe time information is represented as an increment-decrement-information, wherein the increment decrement information describes a difference between a timing of a currently detected transition of the clock-or-strobe signal and a timing of a previous transition of the clock-or-strobe signal;

wherein the data processing unit is coupled to the DUT interface to receive from the DUT interface the data signal and the clock-or-strobe signal, and to select data from the sequence of data samples of the data signal, in response to the clock-or-strobe signal; and wherein the comparator unit is configured to compare the selected data provided by the processing unit with expected data, and to provide a test result based on the comparison of the selected data with expected data.

25. The test for testing a device-under-test, according to claim 24, wherein the tester is configured to perform the sampling of the clock-or-strobe signal and the sampling of the data signal in dependence on one or more timing responses defined by a master clock signal generated in the tester or provided to the tester, and wherein the digitized clock-or-strobe time information describes a timing of the clock-or-strobe signal relative to the master clock signal.

26. The tester according to claim 24; further comprising a data generator unit coupled to the DUT interface and to the comparator unit, wherein the data generator unit is configured to generate data signals, to provide the data signals to the DUT interface, and to generate an information about the expected data.

27. The tester according to claim 24, further comprising a data generator unit coupled to the DUT interface and to the comparator unit, wherein the data generator unit is configured to generate data signals, to provide the data signals to the DUT interface, and to generate an information about the expected data.

28. A method of processing data, comprising:

processing a clock or strobe signal, to sample a clock-or strobe signal, to temporarily store a sequence of samples of the clock-or-strobe signal and detect a transition in the sequence of samples to acquire a digitized clock-or-strobe time information on the basis of the sequence of samples of the clock or strobe signal; and selecting data from a sequence of data samples of a data signal, to temporarily store a sequence of the data samples of the data signal and select data from the temporarily stored sequence of the data samples of the data signal depending on the digitized clock or strobe time information;

wherein the clock-or-strobe signal is physically different from the data signal;

wherein providing the digitized clock or strobe time information comprises providing, as the digitized clock or strobe time information, a digitized time stamp describing a time of a transition of the clock-or-strobe signal;

wherein the digitized clock or strobe time information is represented as a multi-bit value encoding the clock or strobe time information or wherein the digitized clock-or-strobe time information is represented as an increment-decrement-information, wherein the increment-decrement-information describes a difference between a timing of a currently detected transition of the clock-or-strobe signal and a timing of a previous transition of the clock-or-strobe signal.

29. The method of processing data according to claim 28, wherein processing a clock-or-strobe signal comprises sampling the clock or strobe signal with a first sampling frequency $f_{S1}$, which is n-times higher than a first maximum frequency $f_{max1}$ of the clock or strobe signal to acquire samples of the clock-or-strobe signal and identifying a transition of the clock-or-strobe signal using the samples of the clock-or-strobe signal; and wherein selecting data from the sequence of data samples comprises sampling the data signal with a second sampling frequency $f_{S2}$ which is m-times higher than a maximum frequency $f_{max2}$ of the data signal to acquire the sequence of samples; and wherein n≥2 and m≥2.

30. The method of processing data according to claim 28, wherein the sampling of the clock-or-strobe signal and the sampling of the data signal is performed with the same sampling frequency.

31. A computer program for performing a method of processing data comprising:

processing a clock or strobe signal, to sample a clock-or strobe signal, to temporarily store a sequence of samples of the clock-or-strobe signal and detect a transition in the sequence of samples to acquire a digitized clock or strobe time information on the basis of the sequence of samples of the clock or strobe signal; and selecting data from a sequence of data samples of a data signal, to temporarily store a sequence of the data samples of the data signal and select data from the temporarily stored sequence of the data samples of the data signal depending on the digitized clock or strobe time information;

wherein the clock-or-strobe signal is physically different from the data signal;

wherein providing the digitized clock or strobe time information comprises providing, as the digitized clock or strobe time information, a digitized time stamp describing a time of a transition of the clock-or-strobe signal;

wherein the digitized clock or strobe time information is represented as a multi-bit value encoding the clock or strobe time information or wherein the digitized clock-or-strobe time information is represented as an increment-decrement-information, wherein the increment-decrement-information describes a difference between a timing of a currently detected transition of the clock-or-strobe signal and a timing of a previous transition of the clock-or-strobe signal, when the computer program runs on a computer.

* * * * *